UNITED STATES PATENT OFFICE.

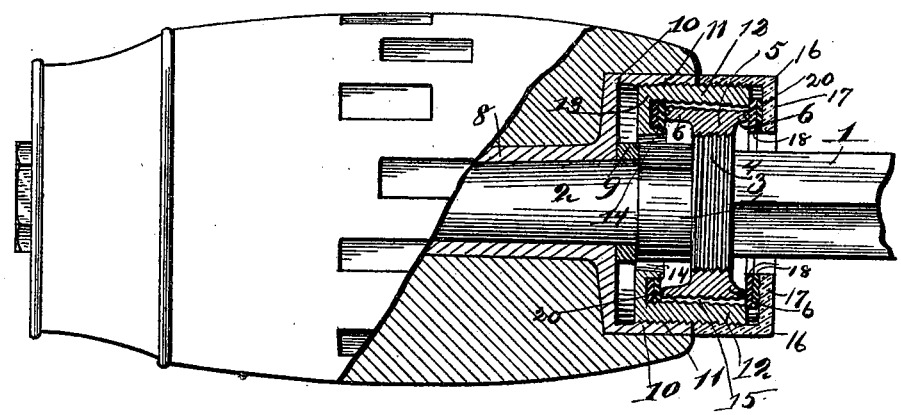

HUGH A. JACOBS, OF CLEVELAND, OHIO.

WATERPROOF PROTECTOR FOR VEHICLE-BEARINGS.

SPECIFICATION forming part of Letters Patent No. 644,605, dated March 6, 1900.

Application filed July 11, 1899. Serial No. 723,513. (No model.)

*To all whom it may concern:*

Be it known that I, HUGH A. JACOBS, a citizen of the United States, and a resident of Cleveland, county of Cuyahoga, State of Ohio, have invented certain new and useful Improvements in Waterproof Protection for Vehicle-Bearings, of which I hereby declare the following to be a full, clear, and exact description, such as will enable others skilled in the art to which it appertains to make and use the same.

My invention relates to improvements in waterproof protection for vehicle-hubs; and it consists in the combination of parts and arrangement of details, as hereinafter described, shown in the accompanying drawings, and specified in the claims.

In the drawings, Figure 1 is a hub shown partly in central longitudinal section to disclose the portion covered by my invention. Fig. 2 is a similar section of a modified form of the device, and Fig. 3 is an end view thereof.

Heretofore great difficulty has been experienced in excluding water from the hub-bearings, especially when a hose has been employed to wash the vehicle, the pressure in the jet of water forcing it into the bearing and injuring the same, especially when friction-balls are employed, which would rust if there were no oil in the bearing or would quickly gum up if the oil and water were mingled together.

To produce a perfectly-dry bearing, therefore, I employ the following novel features.

In the accompanying drawings, 1 is the axle; 2, the tapering spindle, provided with the collar 3, which is partially screw-threaded at 4 to receive a sleeve 5, which projects upon either side of the collar at 6, extending therefrom in narrow flanges.

8 is the spindle-box or hub-lining, which is separated from the collar 3 by means of the washer 9, against which it abuts in the usual manner. The inner extremity of this box is enlarged at 10 and internally screw-threaded at 11 and extends to the inner edge of the hub. Within this enlarged extension is screwed the exteriorly-threaded sleeve 12, which is provided with a vertically-flanged extremity 13 and reëntrant flange 14. This outer sleeve is shown to be directly outside the sleeve 5, but separated therefrom by an annular space 15, so that the sleeves do not come in contact with one another.

A cap 16 completes the construction of the device. This is screwed over the projecting extremity of the outer sleeve and is also provided with a vertical flange 17, corresponding to the flange 13 of the outer sleeve 12. Between these flanges and the outer edge of the extensions 6 are placed washers 18, of felt, leather, or other suitable material, which when compressed between the contiguous parts will become waterproof and exclude all moisture from the bearing.

Two points of compression are employed, so that if moisture should by any misfortune be found beyond the first flange it could not penetrate beyond the second. To assist in excluding moisture from the second point of compression, the adjacent surfaces of the outer and inner sleeves are corrugated at 19, so that the water cannot run into the bearing through the annular space 15, the corrugations tending to prevent any flow in that direction.

The extreme edges of the extensions 6 may, if desired, be grooved at 20, so as to press into the washers and form ridges to prevent moisture from passing.

In Fig. 2 is seen a modified form where both of the flanges 13 and 17 are provided with reëntrant flanges 14 and 21, and the washers 18 are clamped between these flanges and the collar and body of the inner sleeve 5. This form of construction effectually prevents water from being forced past the first set of washers and has the additional advantage of reducing the friction from the washers, since the points of compression are nearer the center of the axle.

I do not claim as my invention the form or proportions of the component parts of the device, nor do I intend to limit its use to any one class of vehicles, since it can be equally well adapted to plain or ball bearings; but

What I claim as new, and desire to secure by Letters Patent, is—

1. In a device for the purpose described, the combination with a spindle, axle and screw-threaded collar thereon, of an inner sleeve screwed upon said collar, and extending in horizontal flanges upon either side thereof of a spindle-box provided with an enlarged inner extremity internally screw-threaded, an outer sleeve exteriorly screw-threaded and provided with a vertical flange and reëntrant flange, at one extremity the said outer sleeve being screwed into said enlarged portion of the box, and an inclosing cap, internally screw-threaded to fit over the outer sleeve, and provided with a vertical flange at the extremity opposite the vertical flange upon the outer sleeve, whereby said vertical flanges are opposed to the extremities of the flanges of the inner sleeve, and washers between said vertical and horizontal sleeves, substantially as described.

2. In a device for the purpose described, the combination with the axle, spindle and screw-threaded collar, of an inner internally-screw-threaded sleeve upon said collar provided with horizontally-extending flanges on either side, a spindle-box provided with an internally-screw-threaded enlarged portion at the inner extremity, an outer sleeve externally threaded for insertion in said enlarged extremity and provided with vertical and horizontal reëntrant flanges at one extremity the said outer sleeve being placed annularly about the inner sleeve, an inclosing cap internally screw-threaded for attachment to the outer sleeve and provided with a vertical and reëntrant flange at the end opposite to the flanges of the outer sleeve, the said reëntrant flanges being arranged to pass between the flanges of the inner sleeve and the axle, and washers between said reëntrant flanges and the inner sleeve and collar substantially as described.

3. In a device for the purpose described, the combination with a spindle, axle and screw-threaded collar thereon, of an inner sleeve screwed upon said collar, and extending in horizontal flanges upon either side thereof, the extreme edges of said extensions being grooved, of a spindle-box provided with an enlarged inner extremity internally screw-threaded, an outer sleeve externally screw-threaded and provided with a vertical flange and reëntrant flange at one extremity, the said outer sleeve being screwed into said enlarged portion of the box, and the adjacent surfaces of the inner and outer sleeves being corrugated, and an inclosing cap internally screw-threaded to fit over the outer sleeve, and provided with a vertical flange at the extremity opposite the vertical flange upon the outer sleeve, whereby said vertical flanges are opposed to the extremities of the inner sleeve, and washers between said vertical and horizontal flanges, substantially as described.

Signed by me at Cleveland, Ohio, this 20th day of June, A. D. 1899.

HUGH A. JACOBS.

Witnesses:
  WM. M. MONROE,
  GEO. O. WILLET.